June 14, 1938.   E. A. STULLER   2,120,656
BUCKLE
Original Filed Aug. 3, 1934
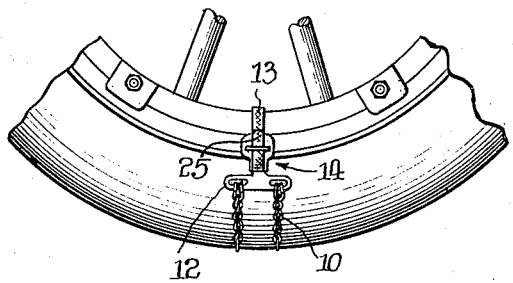
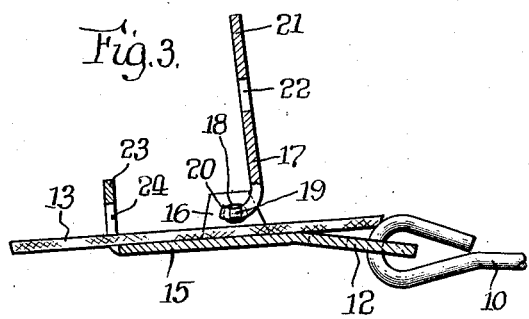
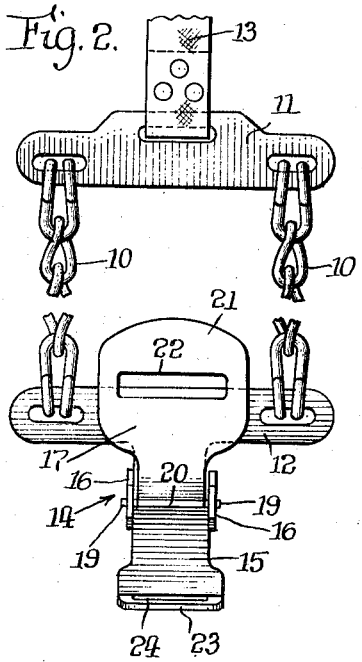
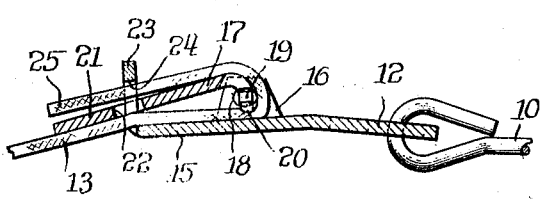
Inventor:
Earl A. Stuller,
By Chindoll Parker Karlson
Attys.

Patented June 14, 1938

2,120,656

UNITED STATES PATENT OFFICE 2,120,656

BUCKLE

Earl A. Stuller, Chicago, Ill., assignor to Western Chain Products Co., Chicago, Ill., a corporation of Illinois Application August 3, 1934, Serial No. 738,223
Renewed April 30, 1938

4 Claims. (Cl. 24—193)

The invention relates generally to buckles and more particularly to a buckle which is especially adapted for use as the securing means for an emergency tire chain.

An object of the invention is to provide a new and improved buckle which is of simple construction and which is operative to hold a tire chain securely in place yet may be quickly and easily released.

Another object of the invention is to provide an improved buckle of this character which embodies a base member having a lever cooperating therewith to effect a binding engagement of a strap and in which a part rigid with the base extends through an arm of the lever for engagement with the free end of the strap to hold the lever in the strap binding position thereof.

Other objects and advantages will become apparent in the following description and from the accompanying drawing, in which:

Figure 1 is a fragmentary side view of the wheel assembly of a vehicle showing an emergency tire chain and buckle embodying the features of the invention affixed thereto.

Fig. 2 is a fragmentary view of a tire chain showing the buckle in its completely open condition.

Figs. 3 and 4 are views showing the buckle in substantially central longitudinal section and illustrating the relationship of parts in different conditions of operation of the buckle.

While the invention is susceptible of various modifications and alternative construction, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

An emergency tire chain of the type which has been shown herein for illustrative purposes comprises a pair of road engaging chains 10 which are dimensioned to fit across the tread portion of a tire and are secured at their ends to suitable cross bars 11 and 12. One of the cross bars, in this instance, the cross bar 11, carries an elongated flexible member preferably in the nature of a fabricated strap 13 which is adapted to fit about the rim and felly of the wheel assembly and to extend across the opposite cross bar 12. Suitable securing means, generally designated 14, is carried by the cross bar 12 for engagement with the free end of the strap to secure the device upon the wheel assembly.

The securing means 14 in this instance comprises a buckle of improved form and simplified construction whereby the free end of the strap may be easily and quickly secured and positively held against release. Referring particularly to Figs. 2, 3 and 4, the cross bar 12 has a flat plate 15 rigidly secured thereto in any suitable manner as by integral formation. The plate 15 constitutes the base of the buckle, occupies substantially the same plane as the cross bar 12 (although preferably it is slightly angled as shown in Figs. 3 and 4 to follow the contour of the tire), and extends outwardly from the cross bar at substantially right angles thereto and on the side thereof opposite that to which the chains 10 are affixed.

Adjacent to the cross bar, the plate 15 carries transversely spaced lugs 16 which are preferably formed integrally with opposite sides of the base and are bent to extend in a direction which is outwardly from the base when the device is assembled upon a wheel. These lugs define a channel on the base through which the free end of the strap 13 may extend and are adapted to support the locking lever 17. To this end the lugs have transversely alined apertures 18 which receive short pintles 19 on the lever 17. The lever is preferably of the bell crank type and has a short leg 20 which is movable, as the lever is swung from an open or strap clearance position, as shown in Fig. 3, to a closed or strap engaging position as shown in Fig. 4 to bind the strap between the end of the lever and an opposed portion of the base.

In the present instance, the lever is so mounted that its elongated arm 21 is swung, in the strap engaging movement thereof, away from the cross bar 12 into a position overlying the outer end of the base plate 15. The outer end of the long lever arm 21 is enlarged, as may be seen in Fig. 2, and is provided with a transverse slot 22. The outer end of the base 15 is turned to provide an outwardly extending end 23 which is arranged to extend through the transverse slot 22 when the lever 17 is in the closed strap engaging position thereof. The out-turned end 23 of the base has an enlarged transverse aperture 24 (best seen in Fig. 3) through which the free end of the strap 13 is extended for engagement by the lever 17. Furthermore, the aperture 24 is of sufficient size to permit the free end of the strap, indicated at 25 (Fig. 4), to be re-inserted through said aperture after the strap has been returned along the outer side of the closed clamping lever.

In operation the clamping lever of the buckle is turned to its open position as indicated in Fig. 3, and the free end of the strap 13, after it has been passed about the wheel assembly, is inserted through the aperture 24 and through the channel defined by the short leg of the clamping lever, the lugs 16, and the base 15. The lever is then swung to bind the strap firmly between the short leg of the lever 20 and the base, which movement projects the out-turned, loop-like end 23 of the base through the slot 22 in the long arm 21 of the lever. The end of the strap 25 beyond the clamped portion thereof is then returned along the outer face of the lever and is passed through the aperture 24. Should a separating pull be exerted on the strap of sufficient force to cause the lever to swing, it will be seen that the returned end of the strap 25 will be bound between the long arm of the lever and the margins of the aperture 24, thereby positively preventing slippage of the strap.

Cross reference is made to my issued Patent No. 2,116,745, dated May 10, 1938, which embodies claims covering generically the subject-matter of invention herein specifically claimed.

I claim as my invention:

1. In a buckle of the character described, the combination of a frame having a base for supporting the adjacent portion of a strap, a cam lever pivoted to the frame for clamping and releasing the strap upon and from the base as the lever is rocked in reverse directions, a transverse slot in said lever, and an out-turned member on said base adapted to extend through said slot when said lever is in the closed position thereof, said out-turned member having an aperture therein disposed in part above the outer surface of the free end of the closed lever, the end of said strap being adapted to be returned along the outer face of the free end of the lever and through said aperture while the lever is in its clamping position to prevent release of the lever.

2. In a buckle of the character described, the combination of a frame having a base for supporting the adjacent portion of a strap, a lever journaled on the frame to swing into and out of engagement with the adjacent portion of the strap for clamping and releasing the same upon and from the base as the lever is rocked in reverse directions, said lever having an operating handle extending toward the entrant end of the buckle when the strap is clamped, said handle being apertured near its free end, and a loop-like member fixed with respect to the base and extending through said aperture when the strap is clamped to engage the free end of the clamped strap after said strap has been returned over the handle of the lever.

3. A buckle of the character described comprising in combination a base for receiving the adjacent portion of a strap, a swingable clamping member mounted thereon and including a part movable into a position adjacent to said base when the clamping member is closed to engage the strap, said part having an aperture therein, and fixed means extending through said aperture when said part is adjacent to said base for engagement with the free end of said strap after the clamped relationship has been established to hold the clamping member against releasing movement.

4. A buckle comprising a plate having a slotted flange, and a lever pivotally mounted on the plate and having a strap-engaging portion arranged to grip a strap when the lever is turned toward parallelism with the plate, the slot of the said flange being so positioned that the end of the strap can be passed therethrough and overlie the free end of the lever to hold the lever and lock it in its gripping position.

EARL A. STULLER.